Jan. 27, 1925.  
J. G. PAPAGEORGE  
1,524,367  
CONFECTION  
Filed Sept. 22, 1922

INVENTOR  
John G. Papageorge.  
by Hazard and Miller  
ATT'YS.

Patented Jan. 27, 1925.

1,524,367

UNITED STATES PATENT OFFICE.

JOHN G. PAPAGEORGE, OF ERIE, PENNSYLVANIA.

CONFECTION.

Application filed September 22, 1922. Serial No. 589,821.

*To all whom it may concern:*

Be it known that I, JOHN G. PAPAGEORGE, a citizen of the United States, residing at Erie, in the county of Erie and State of Pennsylvania, have invented new and useful Improvements in Confections, of which the following is a specification.

My invention relates to confections, and a purpose of my invention is the provision of a confection comprising an edible container formed of separable portions adapted to be filled with an edible substance, such as icecream, sherbets and the like, and associated with each other so that the viscosity of the substance serves to secure the portions in container formation, the container being formed of fluted and tapered sections which are weakened along their connecting edges to permit of a ready removal of any of the sections to allow access to the edible substance.

Although I have herein shown and described only two forms of confection embodying my invention, the novel features of which will be pointed out in claims, it is to be understood that various changes and modifications may be made without departing from the spirit of the invention and the spirit and scope of the appended claims.

In the accompanying drawings.

Figure 1:
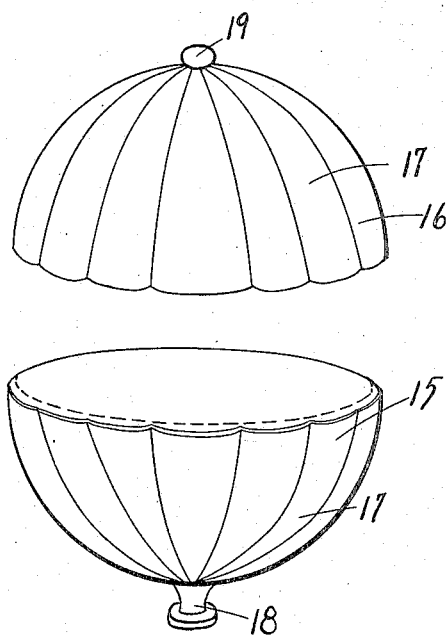
Figure 1 is a view showing in perspective one form of container comprised in the confection embodying my invention.
Figure 2:
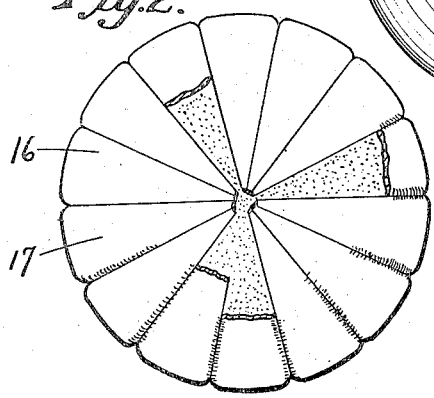
Figure 2 is a top plan view with certain of the sections broken away to illustrate one manner of gaining access to the edible substance within the container.

Referring specifically to the drawings, in which similar reference characters refer to similar parts, my invention in the embodiment shown in Figures 1 and 2, comprises an edible container formed of a cooked batter similar to that of an icecream cone. This container, in the present instance, is composed of two semi-spherical portions designated at 15 and 16, respectively, and each portion is composed of fluted sections 17 which are tapered in width from the edges of the portions to the axis thereof. The edible material of which the portions 15 and 16 are formed is relatively thin, particularly at the connecting edges of any two adjacent fluted sections 17, so as to permit of the breaking of any one section from the container.

Figure 3:
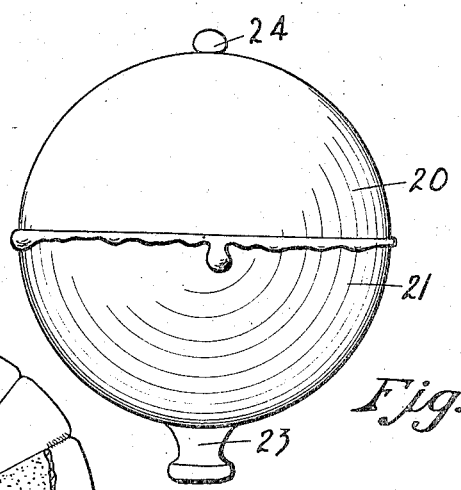
Figure 3 is a view showing in side elevation a slightly modified form of container comprised in the confection embodied in my invention.

Both of the sections 15 and 16 are adapted to be filled with an edible substance such as icecream or the like, so that when the portions are forced together in the manner shown in Figure 3 the icecream will serve to securely hold the portions in spherical formation. The lower section 15 is provided with a supporting handle 18 formed of the same material as the container and arranged so that it may be gripped in supporting the entire confection with one hand while eating. The upper section 15 is provided with a button 19 formed of the same material as the container and arranged in connecting relation with the small ends of the fluted sections 17. This button 19 is adapted to be twisted or broken from the upper section 15 to facilitate any one of the fluted sections being broken away, as shown in Figure 2, so as to allow access to be had to the icecream within the container.

In Figure 3 I have shown an edible container which is also of spherical form composed of upper and lower portions 20 and 21, respectively, each of which is formed without the fluted sections. The lower section 21 is also provided with a handle 23, while the upper section is provided with a button 24, the two operating in the same manner as the corresponding elements shown in Figure 1.

I claim as my invention:

1. An edible container for confections comprising cup-shaped members formed of tapered and fluted sections having weakened portions connecting the sections, and a button formed integral with and connecting the small ends of the tapered and fluted sections of one member to permit of the button being removed to provide an opening in the member at the small ends of the sections.

2. An edible container for confections comprising cup-shaped members formed of tapered and fluted sections having weakened portions connecting the sections, and a button formed integral with and connecting the small ends of the tapered and fluted sections of one member to permit of the button being removed to provide an opening in the member at the small ends of the sections, and a solid knob-shaped handle for supporting the other section.

In testimony whereof I have signed my name to this specification.

JOHN G. PAPAGEORGE.